United States Patent [19]

Schupack

[11] 4,159,361
[45] Jun. 26, 1979

[54] COLD FORMABLE, REINFORCED PANEL STRUCTURES AND METHODS FOR PRODUCING THEM

[76] Inventor: Morris Schupack, 37 Split Rock Rd., South Norwalk, Conn. 06854

[21] Appl. No.: 849,306

[22] Filed: Nov. 7, 1977

Related U.S. Application Data

[63] Continuation of Ser. No. 650,169, Jan. 19, 1976, abandoned.

[51] Int. Cl.² ............................ B32B 5/02; B32B 3/26
[52] U.S. Cl. ...................................... 428/240; 106/99; 52/449; 264/69; 264/257; 264/271; 264/279; 428/241; 428/242; 428/247; 428/255; 428/257; 428/251; 428/306; 428/308; 428/261
[58] Field of Search .............. 428/230, 246, 255, 302, 428/245, 317, 414, 172, 310; 264/69–71, 257, 271, 279; 106/99, 90, 93; 52/449, 454, 600, 630, 223

[56] References Cited

U.S. PATENT DOCUMENTS

| 3,284,980 | 11/1966 | Dinkel ...................................... 52/600 |
| 3,466,822 | 9/1969 | Hull et al. .............................. 52/223 |
| 3,753,849 | 8/1973 | Duff ...................................... 428/414 |

Primary Examiner—George F. Lesmes
Assistant Examiner—P. Thibodeau
Attorney, Agent, or Firm—St. Onge, Steward, Johnston, Reens & Noe

[57] ABSTRACT

Reinforced panel structures include a panel core formed from a cementitious composition that has controlled bleed characteristics. For example, the cementitious composition may comprise hydraulic cement, a dispersing agent, a gelling agent, and water. At least one woven, fabric reinforcing layer in the form of a sheet is laminated in the panel core closely adjacent at least one of its faces. The controlled bleed characteristic of the core composition insures that the reinforcing layer is bonded tightly thereto. The fabric from which the layer is made has a tensile strain that is compatible with the compression strain of the panel core to permit the panel to be cold formed. The cold formable reinforced panel is produced by providing at least one sheet of woven fabric; combining the components of the cementitious composition which may include hydraulic cement, a gelling and a dispersing agent, and water; encapsulating the fabric sheet with the cementitious composition so that the sheet is closely adjacent one face of the uncured composition; vibrating the composition to insure that the fabric is encapsulated therein; and curing the composition.

15 Claims, 9 Drawing Figures

COLD FORMABLE, REINFORCED PANEL STRUCTURES AND METHODS FOR PRODUCING THEM

This is a continuation, of application Ser. No. 650,169, filed Jan. 19, 1976, now abandoned.

BACKGROUND OF THE INVENTION

1. Field of the Invention

The present invention relates to reinforced, cold formable panel structures having a panel core formed from a cementitious composition. Such panel structures have many applications in the building and construction industries when used in their planar configuration since they have properties similar to plywood. However, they also may be bent or otherwise cold formed to many different arcuate configurations to make a wide variety of reinforced concrete articles or structures having shapes which ordinarily are formed before the cementitious composition has cured.

The present invention also relates to methods for producing these cold formable reinforced panel structures which can be either cold formed or used in their planar configuration.

2. Description of the Prior Art

Reinforced panel structures having panel cores formed of a cementitious composition are presently known. U.S. Pat. No. 1,439,954 (Emerson) discloses a gypsum wall board having a body portion made of a gypsum plaster, a Portland cement product or a magnesite cement product that, at one stage of formation process, exists in the plastic state. The plaster may also include a resilient material such as cork or sawdust to prevent cracking of the panel when pierced by a nail, screw or other fastener. A mesh material such as cotton gauze, wire cloth or perforated paper or fabric is applied to both sides of the body portion while it is in the plastic state.

U.S. Pat. No. 3,284,980 (Dinkel) discloses a hydraulic cement panel having five separate elements that include two thin, high density hydraulic cement surface layers in each of which is embedded a fiber mesh, and a thicker core of low density cellular hydraulic cement laminated between the thin, high density surface layers. This panel is intended for use as wall board and may be used in damp environments for constructions such as shower stalls, bathroom floors, swimming pools and the like.

U.S. Pat. No. 3,466,822 (Hull et. al.) discloses concrete structures which are strengthened and rendered self-healing by reinforcement with embedded cross-laid groups of pretensioned yarns. This layer of yarns is disposed midway through the thickness of the panel.

Though the Dinkel and Hull et. al. Patents disclose panels which are somewhat flexible and, hence, are said to be less susceptible to damage during transport and storage, none of the patents cited above describe cold workable panel structures which are used after they have been cold formed to make curved structures and articles having a relatively small radius of curvature. None of these patents disclose methods for producing such panels. Moreover, none of these patents disclose any relationship between the tensile strain of any reinforcing layer to the compression strain of the reinforced panel core during cold deformation.

Other flexible building panel structures are shown in U.S. Pat. Nos. 2,070,527 (Elmendorf); 2,869,182 (White, Jr.); 3,084,403 (Elemdorf); and 3,607,605 (Suzukawa). Still other structural elements are disclosed in U.S. Pat. Nos. 2,252,980 (Rhett); 2,312,293 (Weiss); and Re. 27,061 (Rubenstein). However, none of these patents disclose a cold formable, reinforced panel structure which has a unitary, non-segmented panel core made from a cementitious composition.

Water retentive cementitious compositions suitable for use in the present invention are disclosed in U.S. Pat. No. 3,762,937 to Morris Schupack, the present inventor. This composition has been used for grouting post-tensioned tendons.

SUMMARY OF THE INVENTION

In a preferred embodiment of the present invention to be described below in detail, the cold formable, reinforced panel structures include a panel core formed from a cementitious composition having controlled bleed characteristics, which may, for example, comprise hydraulic cement, a dispersing agent, a gelling agent, and water. The cementitious composition may also contain discrete fibers such as glass or polypropylene in volume ratios as low as 0.25% and up to 5%, to increase impact resistance and edge strength. At least one and preferably two woven, fabric reinforcing layers are laminated in the panel core, each preferably being substantially flush to, or very closely positioned adjacent an opposing face of the panel core. These reinforcing layers control cracking when the panel is cold formed into the desired building shape and when the panel is used in its planar configuration. Further, panels made in accordance with the invention retain strength when bent into curved shapes.

The controlled bleed or water retentive characteristic of the cementitious composition from which the panel core is made insures proper bonding of the top laminated reinforcing fabric layer to the core. Similarly, this controlled bleed characteristic prevents formation of a water "lens" at the surfaces of the panel which would ordinarily create surface panel weakness and poor bond to the fabric. Water retentivity is achieved in a panel core formed of the cementitious composition comprising a hydraulic cement, a gelling agent, a dispersing agent, and water mixed in proportions described below in detail or, alternatively, comprising high air entrainment or just gelling agents.

Further, the tensile strain of the fabric reinforcing layer is compatible with the compression strain of the panel core. That is, the elongation characteristic of the fabric should be greater than approximately 1.25 times the expected compression strain of the panel core when the panel is bent to its minimum cold formable radius. Moreover, the cementitious panel core should have low modulus of elasticity but adequate strength so that compression failure does not occur when the panel is cold formed.

The compatibility of a fabric layer, having desired elongation characteristics, and the core is achieved by entrapping or entraining air in the cementitious composition or mixing a foaming agent or an aggregate having a low modulus of elasticity such as plastic beads with the composition.

Cold workable, reinforced panel structures of the present invention have many applications. They may be used to make reinforced concrete building structures or articles such as drums for cable reels, culverts, pipes, ducts, chutes, cylindrical containers, tanks, roof shells, pallets, and curtain walls.

Furthermore, these panel structures can be composed, specifically when the cementitious composition has low aggregate content or includes an easily workable aggregate, so that they may be cut and handled with ordinary carpenter tools. Generally, they are more advantageous than plywood since they are non-combustible, verminproof, and weather proof.

Because the panel structures are cold workable, that is after the cementitious composition has cured, they may be shipped flat for utilization at the site where they are to be used or assembled. Accordingly, shipping and storing costs of products and structures made with these panels are greatly reduced.

The present invention also relates to methods for producing cold workable, reinforced panel structures. The methods contemplate extending at least one sheet of woven, elastic reinforcing fabric in planar fashion. A cementitious composition having controlled bleed characteristics is mixed. For example, hydraulic cement, a dispersing agent, a gelling agent, and water are then combined to form a workable composition which is deposited on an extended reinforcing fabric sheet to encapsulate it. A second sheet may be positioned closely adjacent the upper surface of the core. The entire assembly is vibrated to insure encapsulation and the cementitious composition is cured. Further, the process may be performed to produce panels in stacked fashion. Thus, mass production economies may be realized.

Accordingly, it is an object of the present invention to provide a cold workable reinforced panel structure that can be formed easily and inexpensively into various products. It is a further object of the present invention to provide simple and inexpensive methods for making such panels.

Other objects, aspects, and advantages of the present invention will be pointed out in, or will be understood from the following detailed description considered in conjunction with the accompanying drawings.

DETAILED DESCRIPTION OF THE PREFERRED EMBODIMENTS

Figure 1:
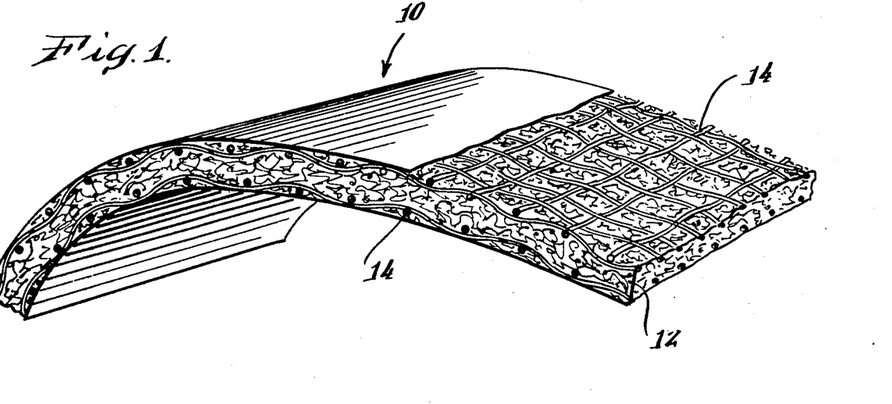
FIG. 1 is a perspective view, partly broken away to show detail, of a cold formable, reinforced panel structure made in accordance with a preferred embodiment of the present invention. The panel is illustrated after it has been bent into an arcuate configuration.
Figure 2:
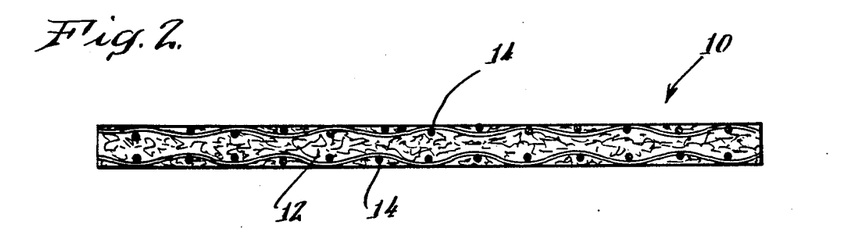
FIG. 2 is a side elevational view of this panel structure, illustrated prior to being bent into the arcuate configuration.
Figure 3:
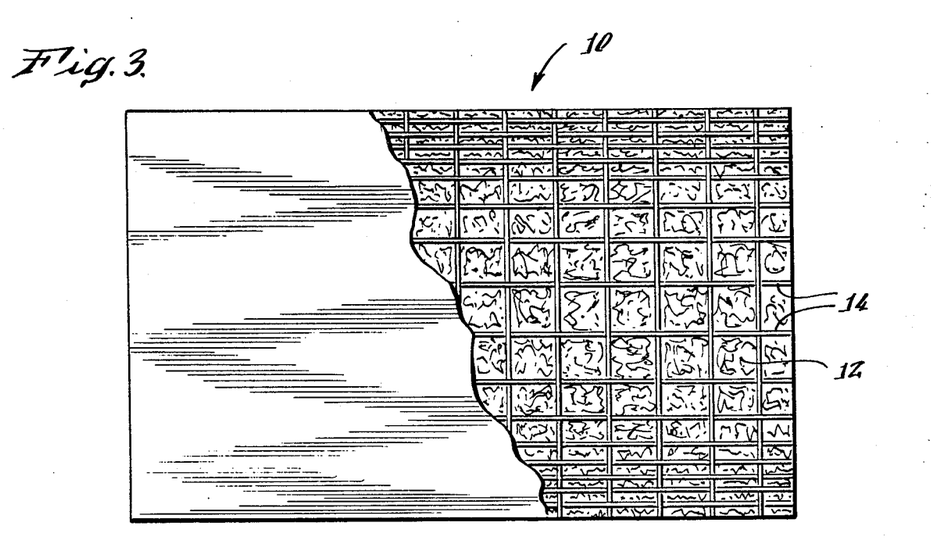
FIG. 3 is a top plan view of the panel structure, also partly broken away to show the weave pattern of the upper layer of elastic, reinforcing fabric.

As shown in detail in FIGS. 1, 2 and 3, the panel structure 10 of the present invention includes a hydraulic cementitious panel core 12 reinforced at both of its faces by an elastic, woven, fabric layer 14. Each reinforcing layer is positioned in the panel core so that its top surface is substantially flush with the outer surface of the panel core.

It is necessary to produce the panel core 12 from a cementitious composition which has controlled bleed characteristics, that is, which exhibits low or substantially no bleed, in order to insure a tight bond between the core and the fabric layers. Stated another way, the cementitious core composition is highly water retentive. The fabric layer must be tightly bonded to the panel core if it is to provide adequate reinforcement to maintain the integrity of the panel. If bleed is permitted, a water "lens" or a thin skin of water at the panel surface may result and, thus, weaken the outer boundary of the panel core and make the upper fabric layer bond poorly to the core. Moreover, it is desirable to make the panel core as homogeneous as possible throughout its thickness.

The panel core may be formed from a water retentive cementitious composition such as shrinkage compensating cement, regulated set cement, expansive cement, or by using a low water-to-cement ratio in the mixing process. It has been found that a cementitious composition comprised of hydraulic cement, preferably Portland-type III cement, a gelling agent, a dispersing agent, and water is well suited for this application, however. An aggregate is also usually added to the composition. The desired water retentive characteristic is achieved when both the gelling and dispersing agents are added to the composition in amounts ranging from 0.05% to 1.5% by weight of the hydraulic cement.

Acceptable gelling agents are available under the trademarks "NATROSOL" sold by Hercules, Inc. and "METHOCEL" sold by Dow Chemical Co. These agents are respectively hydroxyethyl cellulose and methylated cellulose.

Suitable dispersing agents include ligninsulfonates such as those available under the trademarks "MARACON A," sold by American Can Co. and "NOPCOSANT" and "LOMAR D" sold by Nopco Chemical Co. "NOPCOSANT" is comprised of a sulfonated naphthalene and "LOMAR D" is a highly polymerized naphthalene sulfonate which is commercially supplied as a sodium salt.

The proportions of gelling and dispersing agents admixed with the cementitious composition may be adjusted. In particular, it is preferred that the gelling and dispersing agent additives be incorporated in the composition in amounts ranging from 0.1% to 0.5% based on the weight of cement. The exact amount of each additive employed may vary depending upon the particular application, the natures of the aggregate and cement used in the composition, the consolidation methods, the finish requirement of the panel structure, and the relative effective concentration of the particular dispersing and gelling agents employed. For example, gelling agents as well as dispersing agents are available in different concentrations and viscosities. In order to determine the proper proportioning with different gelling agents or dispersing agents, it is necessary to conduct simple tests to determine the relative effective concentration of a particular agent as compared to agents of known effectiveness. Thus, for example, a gelling agent such as "NATROSOL 250H" has been found most effective when used in amounts varying from 0.1% to 0.75% based on the weight of cement. A 2% solution of "NATROSOL 250H" in water has a viscosity of about 30,000 centipoises.

Similarly, a dispersing agent such as "LOMAR D" has been found most effective when used in amounts varying from 0.1% to 0.75% based on the weight of cement.

Depending upon the thixotropic nature of the resulting cementitious composition, the relative amounts of the additive can be altered to improve workability. It is preferred that substantially equal amounts of the gelling and dispersing agents be employed. However, if excessive thixotropy is encountered, the amount of dispersing agent can be increased relative to the amount of gelling agent employed to improve the workability of the composition. Generally, the weight ratio of the dispersing agent to the gelling agent can range from 1-to-1 to 2-to-1.

Aggregates used in the cementitious composition can be selected in accordance with the finished panel density desired. For example, lightweight aggregates such as obtained from expanded forms of slag, clay, shale and slate, produce concrete having a density of from about 80 to about 115 pounds per cubic foot. Ultra-lightweight material such as closed-cell glass beads and plastic such as polystyrene beads can produce ultralight concrete having a density as low as 20 pounds per cubic foot oven dry. So-called normal weight aggregates produce concrete that has a density of from about 140–155 pounds per cubic foot. The rocks which comprise most normal weight aggregates are limestone, quartz, quartzite sandstone, dolomite, trap rock, granite and combinations thereof. Heavyweight aggregates suitable for forming high density concrete are barytes, limonite, magnetite, ilemite, lenotite, steel punchings, crushed cast iron shot and ferrophosphorous. In general, however, most panel applications require the use of a lightweight of ultra-lightweight aggregate to obtain a compression strain of the panel core which is compatible with the tensile strain of the fabric reinforcing layers if they are to be bent or to have the ability to be substantially deflected without rupture.

It is also desirable to use a cementitious composition for the panel core which when cured becomes cellular having entrained or entrapped air. An air entrained composition produces a lightweight panel core, which is desirable, having enhanced cold workable characteristics. In the preferred embodiment of the present invention, a foaming agent is added to the cementitious composition in such amounts which will render the finished panel core up to approximately 70% cellular.

The reinforcing fabric layers 14 are made from an elastic, woven material and have a Young's modulus by stretching in the range of $2 \times 10^6$ lbs./in.$^2$ to $10 \times 10^6$ lbs./in.$^2$. In order to insure compatability between the panel core and reinforcing layers, the elongation characteristic of the reinforcing fabric should preferably be greater than 1.25 times the expected compression strain experienced by the panel at its minimum cold formable radius. Thus, if the panel core experiences a strain of 1% when bent to its minimum radius, the elongation characteristic of the fabric layer should be greater than 1.25%. Moreover, this fabric should be alkali resistant so that damage which might result from reaction with, for example, a highly alkaline Portland, cementitious composition is minimized. Fabrics such as coated fiberglass, or alkaline resistant fiberglass have been found satisfactory. For applications where the panel will remain substantially dry or be used for a short period of time, uncoated fiberglass may be used. Further, if a high aluminous cement is used, a non-alkali resistant reinforcing fabric may be employed.

At times, it is desirable to provide the edges of the panel structure with added strength. This may be accomplished by utilizing reinforcing fabric layers which are more tightly woven at the edges, as shown in FIG. 3, than at the center. Further, when added circumferential bursting strength of the panel structure may be required by the application to which it is put, the fabric strands which extend in the direction of the bend worked into the panel may be made stronger than those which are perpendicular to the direction of the bend. Additional layers of fabric may be used in the panel interior if greater strength is required.

It has been found that certain panel structures constructed as described above, having thickness of ⅛ inch, may be bent to a radius of 6 inches. Similarly, certain panel structures having thickness of 3/16 inches may be bent to a radius of 9 inches and those having a thickness of ¼ inch may be bent to a radius of less than 12 inches. This bending is achieved with very fine, controlled and almost imperceptible cracks being formed. If desired, the cracks may be filled or healed by coating the outer surface of the panel, away from the radius with a polymer such as polyester or epoxy. Such a coating also improves the properties of the panel by making it substantially water impervious. Examples of panel structure characteristics will be given below.

Figure 4:
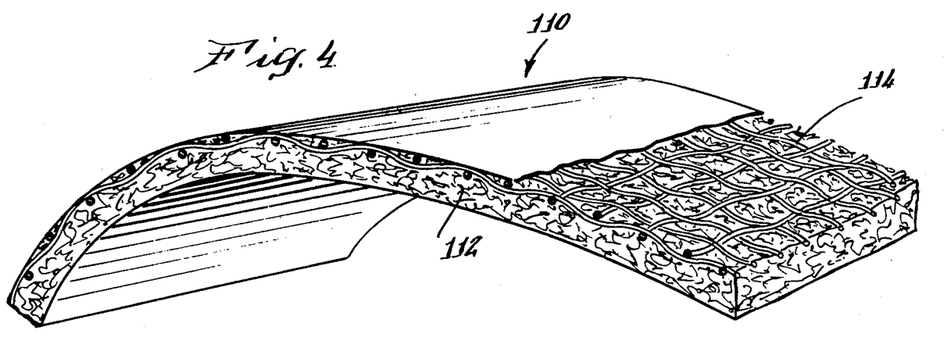
FIG. 4 is a perspective view, similar to that shown in FIG. 1, partly broken away to show detail, of a second embodiment of the present invention.
Figure 5:
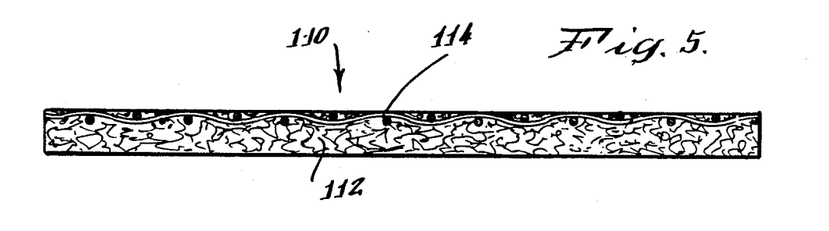
FIG. 5 is a side elevational view, similar to that shown in FIG. 2, of this second embodiment.

A second embodiment of the panel structure of the present invention is illustrated in FIGS. 4 and 5. This panel structure also includes a panel core 112 made from a cementitious composition such as that described above. However, only one surface of the panel core is reinforced by an elastic, woven fabric layer 114. When cold worked, this panel structure should be bent so that the outer surface of the bend is that reinforced by the woven layer.

Figure 6:
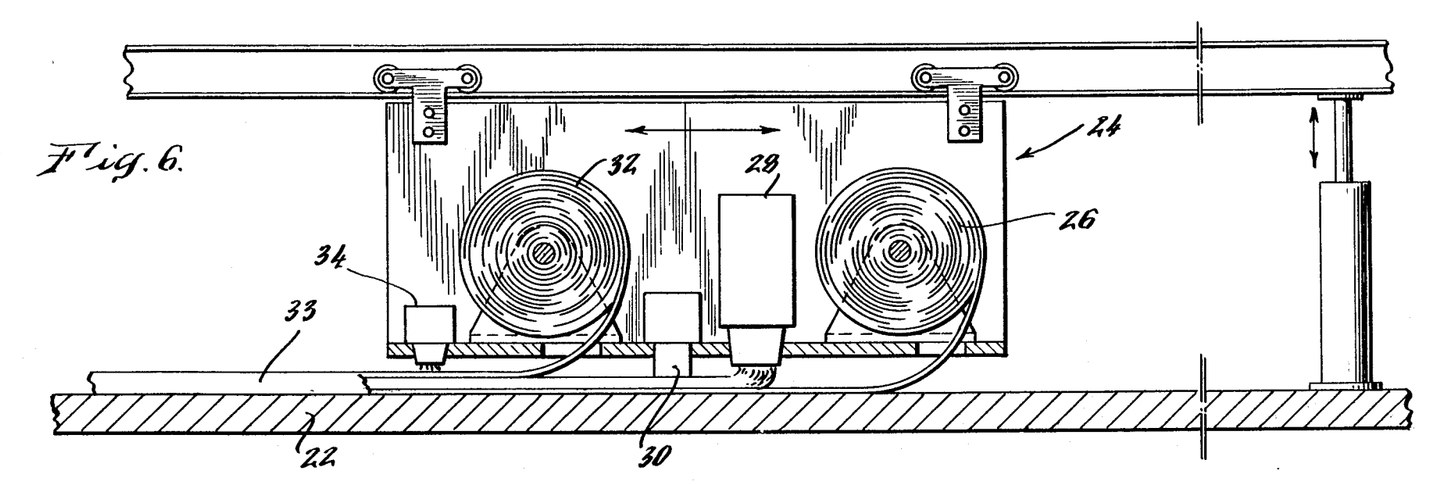
FIG. 6 is a diagrammatic view of apparatus for producing the first embodiment of the panel structure of the present invention.
Figure 7:
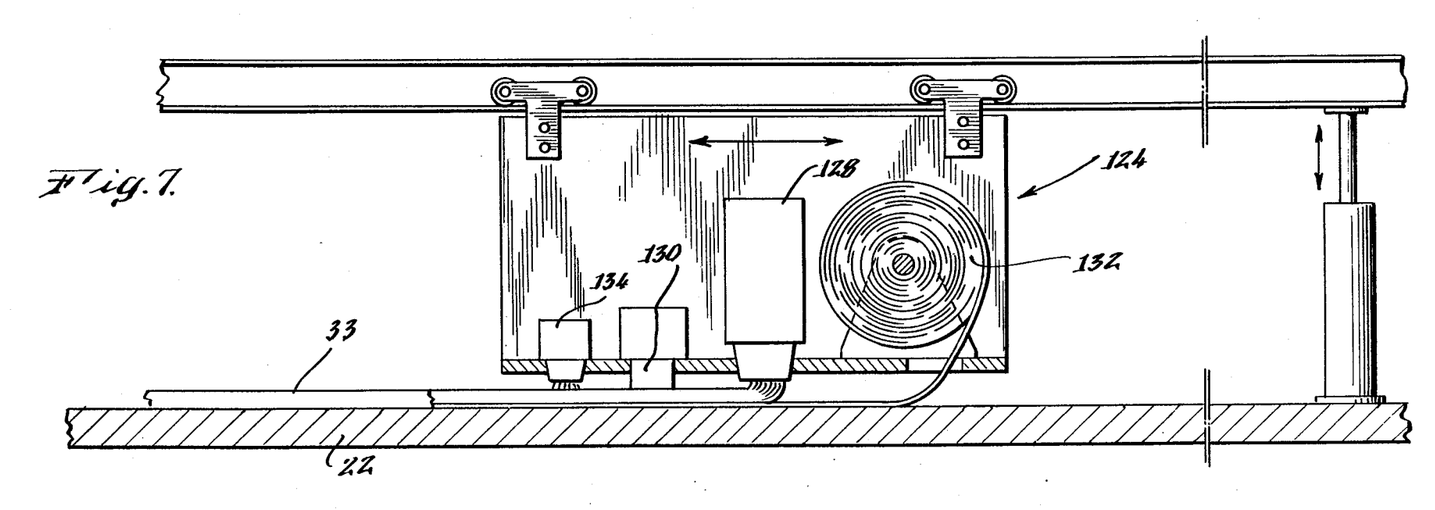
FIG. 7 is a diagrammatic view, similar to that shown in FIG. 6, of apparatus for producing the second panel structure embodiment.

FIGS. 6 and 7 diagrammatically illustrate apparatus for continuously producing panels one on top of the other, in accordance with the present invention. As shown in FIG. 6, the first apparatus includes a forming table 22 which is adapted to be vibrated, and a fabrication train, generally indicated at 24 which is mounted to longitudinally reciprocate over the table 22. A first supply roll 26 which carried reinforcing fabric is mounted at the front of train 24. A cementitious composition depositing hopper 28, a laterally oscillating screed rail 30, a second supply roll of fabric 32, and a bond release curing compound depositing hopper 34 are mounted in sequence behind the first roll 26 on the train 24. Side dams 33 prevent materials deposited on table 22 from flowing over the table edge.

A panel is made by moving the train over the table, and simultaneously paying a first layer of fabric off of the first supply roll 26, depositing a layer of cementitious composition from hopper 28 onto the first fabric layer, smoothing the composition with the oscillating screed 30, paying a second fabric layer onto the screed composition from roll 32, and spraying bond release during curing compound such as that sold under the trademark "WATER SEAL" by E. A. Thompson Co., Inc., San Francisco, Calif., on the assembly from hopper 34. The entire assembly is then vibrated to encapsulate the reinforcing fabrics in the composition. Finally, the panel is cured by one of a number of methods. For example, if a quick set cement is used in the cementitious composition, the panel can be cured in the open air in approximately 30 minutes.

The bond release curing compound permits the next level of fabric concrete to be cast on the previous layer immediately after initial set by repeating the steps noted above using the reciprocating fabrication train 24. This technique of stack casting permits optimum use of the forming table and the fabrication train.

When the fabric concrete panels are adequately cured they can be cut to the required length. Alternatively, panels under ⅜ inches thick can be rolled up into a continuous coil on a drum and shipped to their destination in this form. They can then be paid off and cut to the desired length with a minimum of waste.

FIG. 7 is a similar diagrammatic illustration of the process for producing the singly reinforcing panel structure illustrated in FIGS. 4 and 5. This apparatus includes a reciprocating fabrication train, indicated at 124, that carries a single supply roll 132 from which a single, continuous reinforcing fabric sheet is paid. The roll 132 is mounted ahead of a composition depositing hopper 128, a laterally oscillating screed rail 130 and a bond release curing compound depositing hopper 134. Both hopper and screed rail are identical to those described with reference to FIG. 6. Further, the process of forming the singly reinforced panel is identical to that described above with the exception that a top fabric layer is not laid down after deposition of the cementitious composition.

The following examples illustrate the results which can be achieved by the present invention.

EXAMPLE 1

In a first test, panels reinforced with fabrics having different characteristics were made with a cementitious composition of the following ingredients in the indicated amounts.

| INGREDIENT | AMOUNT |
|---|---|
| Cement | 16.00 lbs (7257.55g) |
| Dispersing Agent (LOMAR D) | .028 lbs. (12.7g) |
| Gelling Agent (NATROSOL 250H) | .028 lbs. (12.7g) |
| Water | 6.88 lbs. (3120.75g) |
| Air Entrapping Agent (PALMOLIVE Liquid) | 1.84 fl.oz. (54.6ml) |

Note that the gelling and dispersing agents are present in equal amounts and each constitutes 0.175% of the composition by weight of cement.

Panels made with this composition yielded the following results:

TABLE 1

| | | 1 | 2 | 3 |
|---|---|---|---|---|
| 1. | Panel No. | 1 | 2 | 3 |
| 2. | Panel Size | 6in × ⅛in × 46in | 6in × ⅛in × 46in | 6in × ⅛in × 46in |
| 3. | Top Fabric Type | 2532 | 7608 | 2532 |
| 4. | Top Fabric Tensile Strength | 325 lb/in | 425 lb/in | 405 lb/in |
| 5. | Bottom Fabric Type | 2532 | 2532 | 2532 |
| 6. | Bottom Fabric Tensile Strength | 405 lb/in | 405 lb/in | 405 lb/in |
| 7. | Panel Side as cast Placed in Tension by Test | Top | Top | Top |
| 8. | Diameter to which Panel was bent | 24 in | 24 in | 24 in |
| 9. | Remarks: | Bent with considerable effort | Bent readily | Bent with difficulty, fabric failed |

The fabrics are supplied by Burlington Glass Fabrics Company, a division of Burlington Industries, 1345 Avenue of the Americas, New York, N.Y. which provides the fabric type designation. Tensile strength of longitudinal and lateral fibers will vary depending on their positioning in the panel and upon how they are woven. That is the longitudinal fibers of the fabric generally have greater tensile strength than the lateral fibers. Therefore, such fabrics ordinarily have two tensile strengths, i.e. a longitudinal and a lateral tensile strength. The tensile strength indicated in TABLE 1 is the longitudinal tensile strength of the fabric which runs in the direction of the bend in each panel.

Moreover, all fabrics used in this and the following examples have a Young's Modulus by stretching in the upper portion of the range from $2 \times 10^6$ to $10 \times 10^6$ lb/in$^2$ to provide a cold formable panel.

In each case the fabric was tightly bonded to the surface of the cementitious panel core made of composition having low bleed characteristics. The panel most easily bent to small diameter, Panel 2, was reinforced with a fabric layer having twisted filaments, Burlington type 7608. The outer two panels were reinforced with fabrics having untwisted filaments.

Panel 1 was bent to a 24 inch diameter with force equal to 75% of the maximum tensile strength of its reinforcing fabric placed in tension. Panel 2 was easier to bend to a 24 inch diameter than Panel 1 and exhibited smaller cracks. Panel 3 was bent to a 24 inch diameter. However, the reinforcing top fabric failed.

EXAMPLE 2

In a second test, panels reinforced with fabrics having 5 different characteristics were made with a cementitious composition of the following ingredients in the following amounts:

| INGREDIENT | AMOUNT |
| --- | --- |
| Cement | 9.75 lbs (4422.57g) |
| Lightweight Aggregate (SOLITE) | 9.75 lbs (4422.57g) |
| Dispersing Agent (LOMAR D) | .017 lbs (7.25g) |
| Gelling Agent (NATROSOL 250H) | .017 lbs (7.25g) |
| Water | 5.04 lbs (2286.13g) |
| Air Entrapping Agent (PALMOLIVE Liquid) | 1.35 fl.oz. (40.0ml) |

Again, gelling and dispersing agents are present in equal amounts, each constituting 0.175% of the composition by weight of cement.

Panels made with this composition yielded the following results.

EXAMPLE 3

Panels made for a third test included panel cores having the following composition.

| INGREDIENT | AMOUNT |
| --- | --- |
| Cement | 16.52 lbs (7493.42g) |
| Dispersing Agent (LOMAR D) | .029 lbs (13.11g) |
| Gelling Agent (NATROSOL 250H) | .029 lbs (13.11g) |
| Water | 6.61 lbs (2998.27g) |
| Air Entrapping Agent (PALMOLIVE Liquid) | 1.77 fl.oz. (52.45ml) |
| ¼ in. Chopped Fiberglass Fibers | .252 lbs (114.31g) |

Gelling and dispersing agents are each present in amounts equal to 0.175% of the weight of the cement and the chopped fiberglass is present in an amount equal to 1.52% of the weight of the cement, at a volume ratio of 0.75% to the volume of the cementitious composition.

Panels made with this composition yielded these results.

TABLE 2

| | | 1 | 2 | 3 | 4 |
| --- | --- | --- | --- | --- | --- |
| 1. | Panel No. | 1 | 2 | 3 | 4 |
| 2. | Panel Size | 6in × ¼in × 40in | 6in × ¼in × 40in | 6in × ¼in × 40in | 6in × ¼in × 40in |
| 3. | Top Fabric Type | 2532 | 2532 | P-9320-50 | 7608 |
| 4. | Top Fabric Tensile Strength | 325 lb/in | 405 lb/in | 230 lb/in | 425 lb/in |
| 5. | Bottom Fabric Type | 2532 | 2532 | 2532 | 2532 |
| 6. | Bottom Fabric Tensile Strength | 405 lb/in | 405 lb/in | 405 lb/in | 405 lb/in |
| 7. | Panel Side Placed in Tension by Test | Top | Top | Top | Top |
| 8. | Diameter to which Panel was bent | 24 | 24 | — | 24 |
| 9. | Remarks: | Bent with difficulty, fabric failed at 24 inch diameter bend | Fabric began to fail at 24 inch diameter bend | Fabric failed | Bent easily, maintain diameter when bending force was released |

TABLE 3

| | | 1 | 2 | 3 | 4 |
| --- | --- | --- | --- | --- | --- |
| 1. | Panel No. | 1 | 2 | 3 | 4 |
| 2. | Panel Size | 6in × ¼ in × 40in | 6in × ¼ in × 40in | 6in × ¼ in × 40in | 6in × ¼ in × 40in |
| 3. | Top Fabric Type | 2532 | 2532 | P-9320-50 | 7608 |
| 4. | Top Fabric Tensile Strength | 325 lb/in | 405 lb/in | 230 lb/in | 425 lb/in |
| 5. | Bottom Fabric Type | 2532 | 2532 | 2532 | 2532 |
| 6. | Bottom Fabric Tensile Strength | 405 lb/in | 405 lb/in | 405 lb/in | 405 lb/in |
| 7. | Panel Side Placed in Tension by Test | Top | Top | Top | Top |
| 8. | Diameter to which Panel was bent | 24 in | 18 in | 24 in | 24 in |
| 9. | Remarks: | Bent easily | Bent easily | Bent easily | Bent easily, maintained diameter when bending force was released |

Fabric was tightly bonded to the panel core made of the low-bleed cementitious composition. Only Panel 4 was reinforced with twisted filament fabric.

Panels 1 and 2 were bent to 24 inch diameter. However, the fabric in Panel 1 failed and the fabric in Panel 2 began to fail. Panel 4 was easily bent to a 24 inch diameter and stayed in its bent configuration when released.

The fabrics were tightly bonded to the panel core. Again, Panel 4 was reinforced with twisted fabric.

All panels in this third test were successfully bent to 24 inch diameter. Panel 2 was then gradually bent to a 18 inch diameter. Panel 4 held its bend when released.

EXAMPLE 4

Tests were also conducted which give an indication of the strength of panels made in accordance with the present invention. Cementitious compositions of the following mixes were used in the respective panels.

Panels made with these cementitious compositions yield the following results in various tests designed to measure their strength.

TABLE 4

| Panel No. | 1 | 2 | 3 | 4 | 5 |
|---|---|---|---|---|---|
| Mix No. | 1 | 2 | 3 | 4 | 5 |
| Panel Size | 6in × 1/8in × 9 1/2in | 6in × 3/8in × 18in | 6in × 3/4in × 18in | 6in × 3/4in × 18in | 6in × 3/16in × 36in |
| Panel Density | 123 lb/c.f. | 119 lb/c.f. | 83.5 lb/c.f. | 93 lb/c.f. | 62 lb/c.f. |
| Top Fabric Type | 7500/38 | 2532 | 2532 | 2532 | 2532 |
| Bottom Fabric Type | 2500/38 | 2532 | 2532 | 2532 | 2532 |
| Top Fabric Tensile Strength | 450 lb/sq.in. | 405 lb/sq.in. | 405 lb/sq.in. | 405 lb/sq.in. | 405 lb/sq. in. |
| Bottom Fabric Tensile Strength | 450 lb/sq.in. | 405 lb/sq.in. | 405 lb/sq.in. | 405 lb/sq.in. | 405 lb/sq.in. |
| Test Span | 8 in. | 16 in. | 17 in. | 16 in. | 9 in. |
| Failure Load | 37 lb. | 136 lb. | 436 lb. | 421 lb. | 133 lb. |
| Deflection | 1/2 in. | 1 3/8 in. | 1/2 in. | 3/4 in. | 1 in. |
| Ultimate Concrete Stress | 4700 psi | 3800 psi | 2709 psi | 2215 psi | 4768 psi |
| Fabric Stress | 131 lb/in. | 239 lb/in. | 414 lb/in. | 350 lb/in. | 248 lb/in. |
| Mode of Failure | Fabric | Bond | Fabric | Fabric | Compression |

| MIX NO. 1 | |
|---|---|
| INGREDIENT | AMOUNT |
| Cement | 1.72 lb (782g) |
| Dispersing Agent (LOMAR D) | .002 lb (.87g) |
| Gelling Agent (NATROSOL 250H) | .002 lb (.87g) |
| Water | .61 lb (311.5g) |

| MIX NO. 2 | |
|---|---|
| INGREDIENT | AMOUNT |
| Cement | 18.25 lb (8297.38g) |
| Dispersing Agent (LOMAR D) | .011 lb (5.18g) |
| Gelling Agent (NATROSOL 250H) | .011 lb (5.18g) |
| Water | 7.25 lb (3296.22g) |

| MIX NO. 3 | |
|---|---|
| INGREDIENT | AMOUNT |
| Cement | 18.75 lb (8524.70g) |
| Dispersing Agent (LOMAR D) | .033 lb (14.92g) |
| Gelling Agent (NATROSOL 250H) | .033 lb (14.92g) |
| Water | 7.5 lb (3409.88g) |
| Ultra-lightweight Aggregate (Styrofoam glass beads used instead of air entrapment) | 1.58 cu.ft. (3730cc) |

| MIX NO. 4 | |
|---|---|
| INGREDIENT | AMOUNT |
| Cement | 9.5 lb (4319.18g) |
| Dispersing Agent (LOMAR D) | .017 lb (7.56g) |
| Gelling Agent (NATROSOL 250H) | .017 lb (7.56g) |
| Water | 4.0 lb (1818.60g) |
| Air Entrapping Agent (PALMOLIVE Liquid) | 1.08 fl.oz. (32ml) |

| MIX NO. 5 | |
|---|---|
| INGREDIENT | AMOUNT |
| Cement | 6.0 lb (2727.90g) |
| Dispersing Agent (LOMAR D) | .01 lb (4.77g) |
| Gelling Agent (NATROSOL 250H) | .01 lb (4.77g) |
| Water | 3.3 lb (1500.35g) |
| Air Entrapping Agent (PALMOLIVE Liquid) | 1.01 fl.oz. (30ml) |

It can be seen that panel structures made by this method compare very favorably with other building materials such as plywood.

Figures 8, 9:
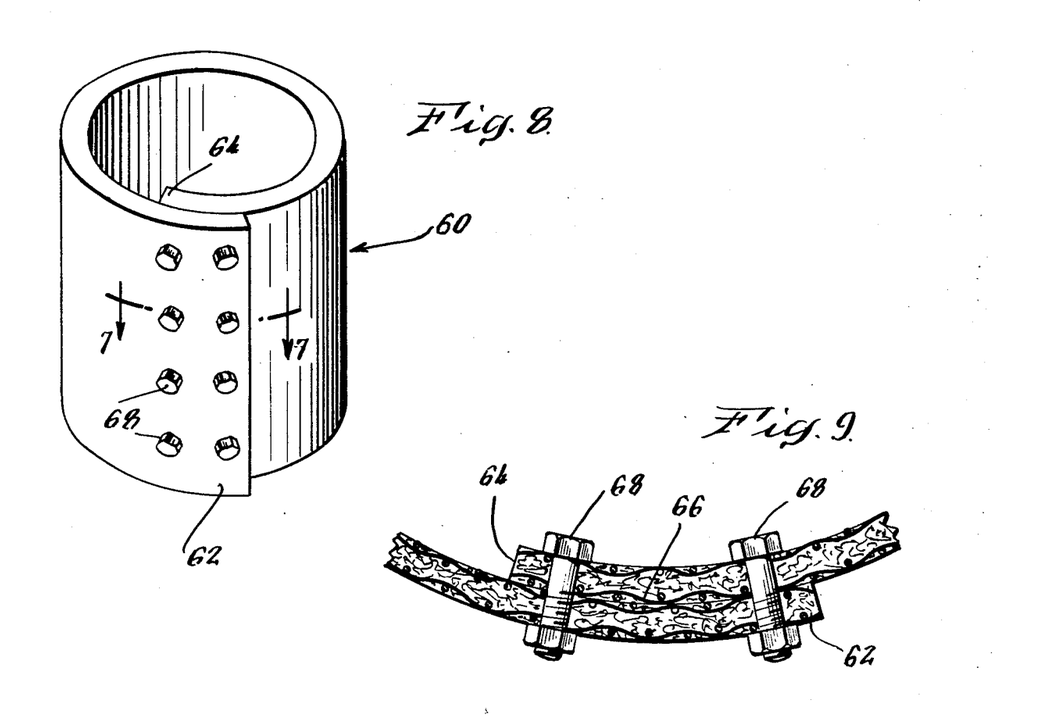
FIG. 8 is a perspective view of a cylindrical culvert, tank, or cable reel drum which may be made from these panel structures.
FIG. 9 is an enlarged partial top plan view of the seam in this tank.

FIG. 8 illustrates a cylinder 60 which may be made from a panel structure constructed in accordance with the present invention by bending the structure in the same fashion as was done in the examples noted above. This cylinder may be used as a pipe, as a drum for a cable reel, as a tank or for any other similar article. An acceptable assembly construction for forming the cylinder is illustrated in FIG. 9. In particular, respective ends 62 and 64 of the panel structure are merely overlapped and are sealed together by a suitable adhesive 66. Bolts 68 may be passed through the overlapped portion of the cylinder to enhance its structural strength if desired or these bolts may be the primary splice connector and adhesive may be omitted.

The cold formable panel structures made from a cementitious composition as described above may be used for many other applications also. For example, they may be used for chutes, roof shells, curtain walls, curved fences and other concrete forms. Prior to assembly, articles made from these panel structures may be stored with the panel in either its planar or rolled form and later may be assembled at a delivery site or where the article is intended to be used. Therefore, such articles are economical to store and ship.

The panels may also be used in a flat or nearly flat configuration and the use of a lightweight non-crushable cement matrix provides a panel having deflection characteristics as good or better than plywood and like materials. In such flat or near flat uses the fabric does not have to be as elastic as in the cold formable applications. In the making of flat panels the water retentive cement composition provides a very strong bond between the matrix and the fabric at the panel surfaces.

The terms "cold formed" and "cold formable" as used herein mean that the panels can be shaped into curved configurations after casting and curing of the panel matrix.

Although specific embodiments of the present invention have been disclosed above in detail, it is to be understood that this is only for purposes of illustration. Changes may be made to the described panel structures and methods for producing them by those skilled in the art in order to adapt the structures and the methods to particular applications.

What is claimed is:

1. A reinforced panel structure comprising:
   a panel core formed from a water retentive cementitious composition comprising cement, an aggregate, at least one gelling agent, and at least one dispersing agent, said gelling and dispersing agents each being present in said composition in the range of 0.05% to 1.5% by weight of the cement to provide low water bleed characteristics, and
   at least one fabric reinforcing layer being disposed in said panel core closely adjacent to one face of said panel core, said fabric having a Young's modulus by stretching in the range of from about $2 \times 10^6$ lbs./in$^2$ to about $10 \times 10^6$ lbs./in$^2$.

2. The reinforced panel structure as claimed in claim 1 wherein said fabric reinforcing layer is made from an alkali resistant material to inhibit the destructive effects of an alkali cementitious composition thereon.

3. The reinforced panel structure as claimed in claim 1 wherein said panel is bendable; wherein said fabric reinforcing layer is disposed on the side of said panel away from the radius of a curve into which said panel is bendable; and wherein said fabric reinforcing layer has an elongation characteristic which is greater than 1.25 times the compression strain experienced by said panel core when bent to minimum cold formable radius.

4. The reinforced panel structure as claimed in claim 1 wherein said reinforcing fabric layer is woven more tightly at the edges of said panel structure than at its center.

5. The reinforced panel structure as claimed in claim 1 wherein said panel is cold formable and wherein said cementitious composition further comprises at least one of an air entraining agent and air entrapping agent to lighten and enhance the cold workability of said panel structure by increasing the compression strainability thereof.

6. The reinforced panel structure as claimed in claim 5 wherein said one of said air entrapping and entraining agent is present in said cementitious composition in an amount sufficient to render said panel core up to 70% cellular by volume.

7. A reinforced structural panel capable of being bent, after setting, into a curved structural member without substantial loss of structural strength comprising:
   a panel core matrix of a substantially homogeneous cementitious composition including cement, an aggregate, at least one gelling agent, at least one dispersing agent, said gelling and dispersing agents each present in said composition in the range of 0.05% to 1.5% by weight of the cement to provide low water bleed characteristics, and at least one of an air entrapping agent and an air entraining agent which permits compression of said matrix,
   a fabric reinforcing layer bonded to said matrix closely adjacent each face of said matrix, the Young's modulus of elasticity of said fabric being between about $2 \times 10^6$ lbs./in$^2$ and about $10 \times 10^6$ lbs./in$^2$ and having an elongation characteristic more than 1.25 times the compression strain experienced by said panel core matrix when the panel is bent to a curved panel of minimum radius.

8. A reinforced panel structure which is bendable into a curved structure without substantial loss of structural strength, comprising:
   a panel core formed with a water retentive cementitious composition comprising cement, an aggregate, at least one gelling agent and at least one dispersing agent, said gelling and dispersing agents each being present in said composition in the range of 0.05% to 1.5% by weight of the cement to provide low water bleed characteristics
   at least one fabric reinforcing layer being disposed in said panel core closely adjacent to one face of said panel, said fabric reinforcing layer being disposed on the side of said panel away from the radius of a curve into which said panel is bendable; and wherein said fabric reinforcing layer has an elongation characteristic which is greater than 1.25 times the compression strain experienced by said panel core when bent to a curved panel of minimum radius.

9. A method for producing a reinforced panel structure, comprising the steps of:
   A. depositing a substantially homogeneous water retentive cementitious composition comprising cement, an aggregate, at least one gelling agent, and at least one dispersing agent, said gelling and dispersing agents each being present in said composition in the range of 0.05% to 1.5% by weight of the cement to provide low water bleed characteristics, onto a forming table,
      1. screeding the top surface of said composition;
   B. laying a first sheet of elastic reinforcing fabric on the upper surface of the deposited and screeded cementitious composition in its uncured condition;
   C. vibrating the cementitious composition to encapsulate the fabric sheet at a position closely adjacent the upper surface of the cementitious composition; and
   D. curing the cenentitious composition in which the fabric sheet is encapsulated.

10. The method for producing a reinforced panel structure as claimed in claim 9 further comprising the step of depositing a curing bond release compound on the panel structure after said fabric laying step and repeating steps A through D to produce a second panel structure directly above the first.

11. The method for producing a reinforced panel structure as claimed in claim 9 further comprising the step of:
   positioning a second sheet of woven, elastic reinforcing fabric in closely spaced, substantially parallel relation to the forming table prior to said cementitious composition depositing step.

12. The method for producng a reinforced panel structure as claimed in claim 11 further comprising the step of depositing a curing bond release compound on the panel structure after said fabric laying step and repeating step A through D and said fabric positioning step to produce a second panel structure directly above the first.

13. The method of producing a reinforced panel structure as claimed in claim 11 further comprising the steps of laying down said first sheet of fabric, said cementitious composition and said second sheet of fabric from a moving train to continuously produce a strip of panel and then cutting the panel strips to length.

14. The method for producing a reinforced panel structure as claimed in claim 12 wherein said cementitious composition further comprises one of an air entraining agent and an air entrapping agent to lighten and enhance the flexibility of said panel core by increasing the compression strainability thereof.

15. The method for producing a reinforced panel structure as claimed in claim 14 wherein one of said air entrapping agent and air entraining agent is present in said cementitious composition in an amount sufficient to render said panel core up to 70% cellular by volume.

* * * * *